United States Patent [19]
Grundei

[11] Patent Number: 6,076,814
[45] Date of Patent: Jun. 20, 2000

[54] SPRING STRUT FOR VEHICLES

[75] Inventor: Manfred Grundei, Niederwerrn, Germany

[73] Assignee: Mannesmann Sachs AG, Schweinfurt, Germany

[21] Appl. No.: 09/082,763

[22] Filed: May 21, 1998

[30] Foreign Application Priority Data

Jun. 4, 1997 [DE] Germany ............................ 197 23 347

[51] Int. Cl.[7] ........................................................ F16F 9/06
[52] U.S. Cl. ............................................. 267/221; 188/315
[58] Field of Search ..................... 267/34, 221; 188/315, 188/322.16

[56] References Cited

U.S. PATENT DOCUMENTS

| | | | |
|---|---|---|---|
| 3,661,236 | 5/1972 | Wossner | 188/315 |
| 4,485,899 | 12/1984 | Grundei | 188/315 |
| 4,568,067 | 2/1986 | Iwata | 267/221 |
| 4,647,026 | 3/1987 | Siemann et al. | 188/315 |
| 5,615,756 | 4/1997 | Grundei et al. | 188/322.15 |

*Primary Examiner*—Chris Schwartz
*Attorney, Agent, or Firm*—Cohen, Pontani, Lieberman & Pavane

[57] ABSTRACT

The invention is directed to a spring strut for motor vehicles comprising a hydropneumatic vibration damper and a supporting spring. The vibration damper has a piston rod connected with a piston and is axially guided in a piston rod guide at the end of a container. The piston rod is outwardly sealed by a piston rod seal. The piston rod guide comprises a damping valve acted upon by external forces, such as the force of the supporting spring arranged between a structural component part connected with the vehicle and a spring carrier surrounding the container of the spring strut. The spring carrier acts on the damping valve with a contact surface. The supporting spring and/or the spring carrier cooperates with at least one auxiliary device exerting a force. The auxiliary device is supported at the container by a structural component part that is fixed with respect to the container or at a vehicle part which is connected with the container.

13 Claims, 5 Drawing Sheets

SPRING STRUT FOR VEHICLES

BACKGROUND OF THE INVENTION

1. Field of the Invention

The invention is directed to a spring strut, especially for motor vehicles, comprising a hydropneumatic vibration damper and a supporting spring.

2. Description of the Related Art

A prior art spring strut is disclosed, for example, from DE 44 03 196 A1, wherein the vibration damper has a characteristic diagram of damping force suited to requirements. This is achieved in that the damping force characteristic diagram is formed of at least three individual force diagrams. A first damping force characteristic diagram takes effect within a middle range associated with the relatively short springing-in movement. The first damping force characteristic diagram exerts a small, preferably decreasing, damping force in response to these small spring paths. In this way, unevenness in roadways such as cobblestones which act on the vibration dampers at higher frequencies are damped to a lesser degree.

This first damping force diagram passes into another damping force diagram with rising damping values both in the pull direction and in the push direction, so that larger springing-in and springing-out movements are progressively damped. This is achieved by a damping valve arrangement in the region of the piston rod guide with a flow direction for the pull direction and push direction. The damping valve comprises a valve spring upon which the spring force of the vehicle supporting spring is superposed in an additive manner. A load-dependent action of the vibration damper is achieved in this way. A pressure buffer which takes effect during a larger springing-in movement generates an increase in damping force, while a hydraulic-mechanical tension stop takes effect during larger springing-out movement. A disadvantage in this construction consists in that the load-dependent action of the vibration damper in particular is directly dependent on the springing force of the supporting spring, so that a predetermined desired damping force process is not realizable.

SUMMARY OF THE INVENTION

The object of the present invention is to provide a spring strut for motor vehicles that is constructed in a simple manner and manufactured economically whose damping force behavior is adapted substantially to the required or desired characteristic diagram.

This object is met by the invention in that the supporting spring and/or the spring carrier of the inventive spring strut is arranged to cooperate with at least one auxiliary device which exerts a force on the supporting spring. The auxiliary device is supported at the reservoir or container of the spring strut, at a structural component part that is fixed with respect to the container. The auxiliary device may also be supported at a vehicle part which is connected with the container. The supporting spring force acting on the damping valve may be varied by the auxiliary device, so that vibration damping with variable load dependence is adjusted to conform to a desired damping force configuration. An auxiliary device of the invention is easily combined with known buffers or stops acting in the push and/or pull directions.

The auxiliary device may comprise a mechanical spring, a pneumatic spring or a hydraulic cushion, wherein the auxiliary device is preferably arranged so as to act on the spring carrier. A very simple device which adapts to a desired damping configuration without difficulty is obtained in that the force exerted by the auxiliary device on the spring carrier is continuously adjustable.

In spring struts having a helical pressure spring as a supporting spring, the auxiliary device is formed in an embodiment example by a helical spring which surrounds the container and is fitted between a spring plate formed by the spring carrier and an adjusting ring which is preferably continuously adjustable. In this way, a very simple and sensitive adjustment of the counterforce acting on the helical pressure spring is possible, wherein the counterforce is constant over the entire stroke of the spring strut, since the adjusting path at the damping valve is very small.

In a further embodiment, the auxiliary device comprises a pneumatic spring or a hydraulic cushion arranged so as to act on the spring carrier on the one hand and on a supporting ring on the other hand. During a drop in pressure in the pneumatic spring or in the hydraulic cushion, a correspondingly higher force component of the supporting spring acts on the damping valve. A complete absence of pressure in the pneumatic spring or in the hydraulic cushion consequently results in the greatest possible force acting on the damping valve that also results in the highest possible damping force, so that a fail-safe effect is achieved.

In a further embodiment, the auxiliary device has a spring element comprising a disk spring or a diaphragm spring supported between a structural component part which is fixed with respect to the vibration damper and a flexible disk or a transmission ring. The spring element may be provided in addition to the mechanical spring which can be adjusted with respect to force, or in addition to the pneumatic spring or the hydraulic cushion, so that the damping valve is further adapted to a desired configuration. This is especially true since the spring force of the disk spring may also be arranged to act in the opposite direction to the spring force of the supporting spring.

A vibration damper with a simple and elegant construction is achieved in that the spring element is a disk spring with an outer diameter of the disk spring fitting in an annular groove of the piston rod guide and an inner diameter centering the transmission ring by an annular cut out portion. The flexible disk which forms the contact surface of the spring carrier is also simple because, in accordance with the feature, this flexible disk also comprises the carrier plate for the piston rod seal and accordingly carries out a dual function.

In another embodiment form, the disk spring is arranged externally and above the piston rod seal, wherein the spring force acts on the spring carrier or on the flexible disk depending on the installation position. Accordingly, it is also possible in this construction to install the disk spring in such a way that its spring force acts in the direction of the damping valve or in the opposite direction.

Further, in spring struts with a supporting spring comprising a pneumatic or gas spring, the auxiliary device may comprise a spring bellows fixedly connected with the spring carrier and with a spring cup arranged at the free end of the piston rod. Accordingly, in a construction of this kind, the auxiliary device also acts on the spring carrier and opposite to the spring force of the pneumatic supporting spring.

It is possible to adapt to the required or desired load-dependent change in damping force in the vibration damper through a corresponding rating of the force of the auxiliary device, wherein both higher forces as well as lower forces may be exerted on the damping valve.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
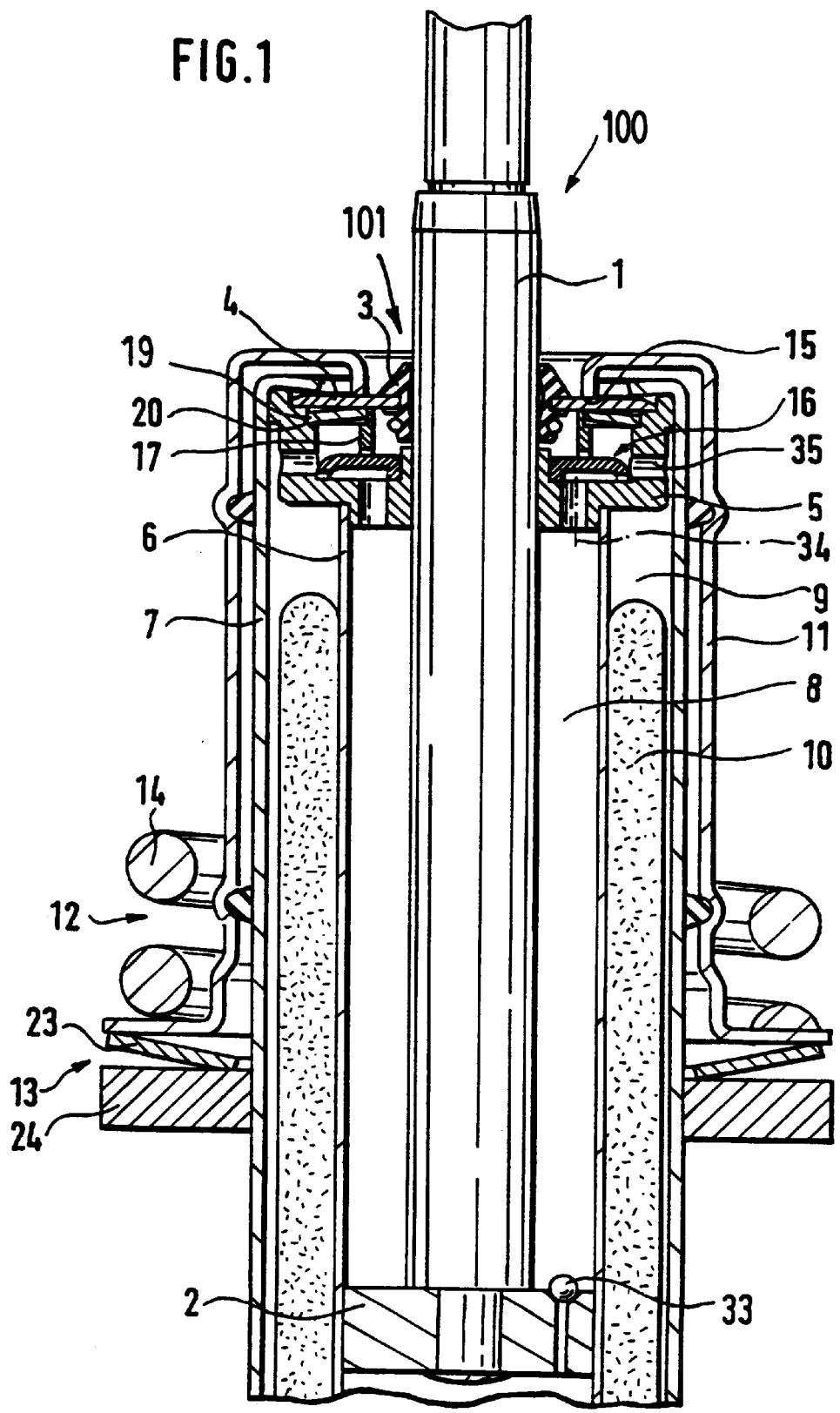
FIG. 1 is a sectional view of an upper region of a spring strut according to an embodiment of the invention along a longitudinal axis.

Referring initially to FIG. 1, a spring strut 100 according to the present invention comprises a vibration damper 101 and a supporting spring 12. The vibration damper includes a piston rod 1 connected to a piston 2, wherein the piston rod 1 is guided through a piston rod guide 5 that is inserted in one end of a container 7 of the spring strut 100. A piston rod seal 3 connected with the piston rod guide 5 outwardly seals the piston rod 1. The piston 2 slides on an inner wall of a cylinder 6 within the container 7. The upper end of the cylinder 6 is centered with respect to the container 7 by the piston rod guide 5. The container 7 encloses the cylinder 6 at a radial distance and forms a compensation space 9 in which a gas filling, preferably a gas bubble 10, is arranged. The piston 2 includes a non-return or check valve 33 which opens during the inward movement of the piston rod 1 so that a hydraulic connection between a work space 8 on the piston rod side above the piston 2 and a work space located below the piston 2 is formed and the cylinder 6 is filled with damping fluid during the inward movement. A bottom end of the supporting spring 12, which is formed in this construction as a helical pressure spring 14, is supported on a spring carrier 11 which surrounds the container 7 and is centered and guided by guide rings on the outer wall of the container 7. The other end of the helical pressure spring 14 is supported in a spring plate, not shown, which is connected with the vehicle body, so that the body mass of the vehicle is supported over the spring strut 100.

The spring carrier 11 cooperates with the piston rod guide 5 at the upper end of the container 7. A contact surface 15 of the spring carrier 11 abuts a flexible disk 4 of the piston rod guide 5. The supporting force exerted on the spring carrier 11 is transmitted through the flexible disk 4 and a transmission ring 17 to a damping valve 16 located in the piston rod guide 5. The flexible disk 4 simultaneously forms a carrier plate for the piston rod seal 3. The transmission ring 17 is preferably centered by a spring element 19 that may be constructed as a disk spring. The outer diameter of the spring element 19 engages an annular groove 20 of the piston rod guide 5 and its inner diameter cooperates with the annular cut out portion of the transmission ring 17. The damping valve 16 is arranged between the work space 8 on the piston rod side and the compensation space 9 and comprises openings in the piston rod guide 5 in the axial direction 34 and in the radial direction 35.

An auxiliary device 13 acting on the spring carrier 11 comprises a spring 23, which is constructed as a disk spring in FIG. 1, and is supported at the spring carrier 11 on one side and on an adjusting ring 24 on the other side. The adjusting ring 24 comprises an internal thread that threadably engages a corresponding external thread on the container 7. An threaded adjustment of the position of the adjusting ring 24 accordingly enables a sensitive adjustment of the supporting force acting on the damper valve 16 of the piston rod guide 5. The spring element 19 may also be included with this auxiliary device 13, since the spring element 19 also acts on the damping valve 16.

Damping actions which are no longer directly proportional to the amount of load on supporting spring 12 are realized in a very simple manner with the spring strut 100 of the present invention. The auxiliary device 13 is designed such that a change in the force of the auxiliary device 13 acting on the spring carrier 11 corresponds to the change in the load, wherein the damping force is constant over the entire stroke of the spring strut. The lift of the damping valve 16 is small and therefore does not require any change in the force of the auxiliary device 13 to be taken into account. The spring element 19 also exerts a force acting continuously on the damping valve 16. In a corresponding manner, the spring force of the supporting spring 14 acting on the damping valve 16 for the damping effect is adjustable within a very great range to required or desired values.

The vibration damper 101 operates in such a way that there is a flow through the damping valve 16 in the same flow direction for pull damping as well as for push damping. That is, the volume of the work space 8 on the piston rod side corresponding to the respective path of the piston rod reaches the compensation space 9 through the damping valve 16 when the check valve of the piston 2 is closed. The damping fluid accordingly flows out of the work space 8 on the piston rod side through the openings in the axial direction 34 to the damping valve 16 and through the damping valve 16 and the openings in the radial direction 35 into the compensation space 9. The larger the springing-out path of the piston rod, the smaller the force exerted by the supporting spring 12 on the damping valve 16, while the damping effect is also dependent upon the amount of damping fluid flowing through the damping valve 16, that is, upon the effective cross section of the work space 8.

In the case of push damping, the amount of damping fluid corresponding to the piston rod volume moving into the cylinder 6 is pressed through the damping valve 16, wherein the lower work space is closed toward the compensation space 9 by a check valve 33, and the check valve 33 in the piston 2 opens. The greater the path of the piston rod 1 moving into the cylinder 6, the greater the spring force of the supporting spring 12 acting on the damping valve 16. A further influence on the pull damping and push damping is achieved through the ratio of the cross section of the work space 8 to the cross section of the piston rod 1. In the spring strut 100 in FIG. 1, this ratio is constant.

Figure 2:
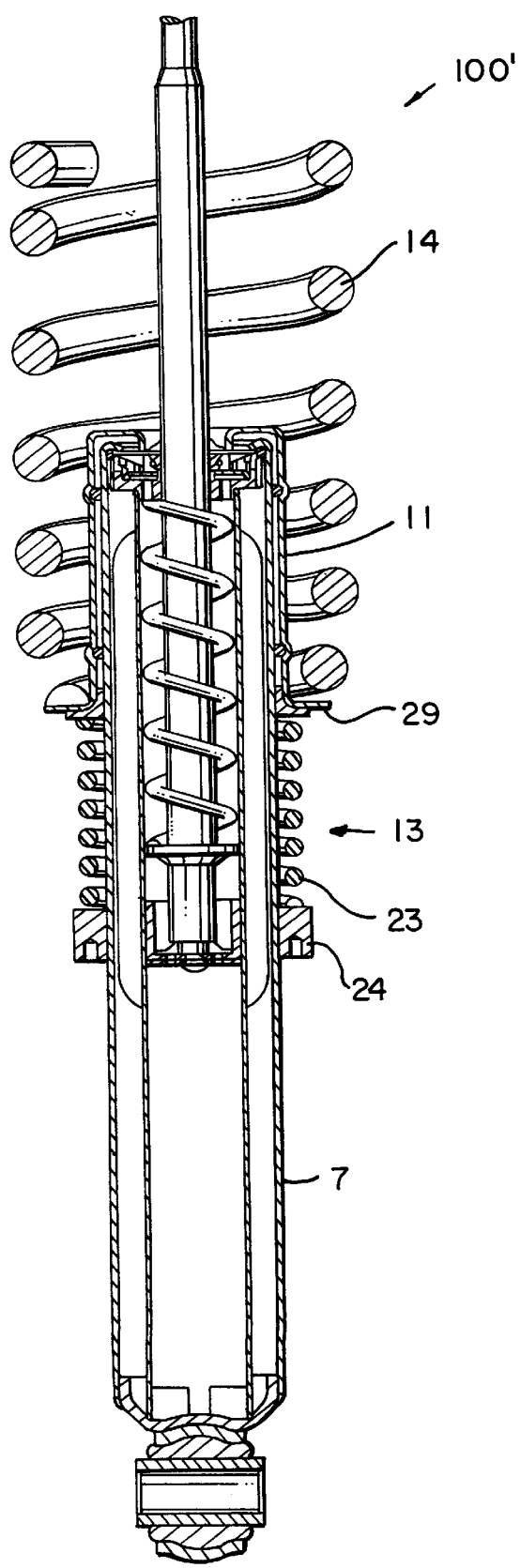
FIG. 2 is a sectional view of another embodiment of the spring strut according to the invention with an auxiliary device acting on the supporting spring having a helical spring.

FIG. 2 shows another embodiment of a spring strut 100' that differs from the construction in FIG. 1 essentially in that the auxiliary device 13 comprises a helical spring 23. This helical spring 23 is adjusted by the adjusting ring 24 threadably arranged on the container 7 to the spring force that is desired and that is directed opposite to the helical pressure spring 14. Operation of the spring strut 100' corresponds to that of the spring strut 100 according to FIG. 1.

Figure 3:
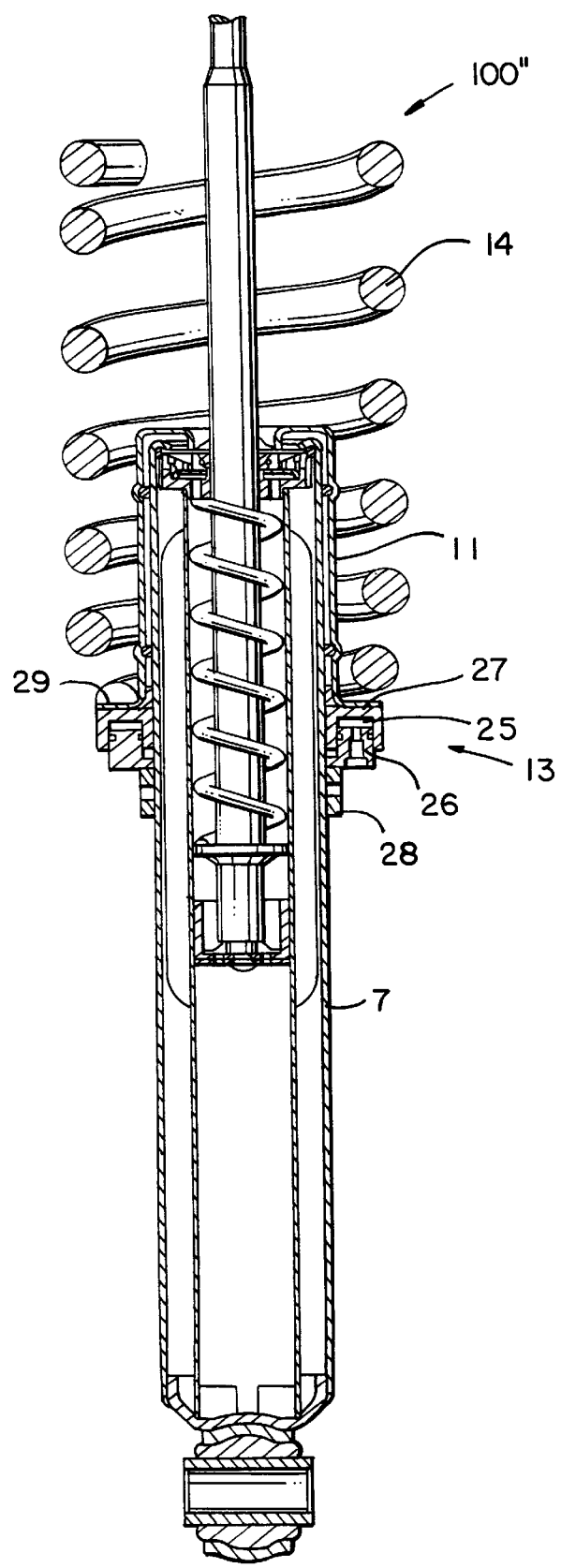
FIG. 3 is a sectional view of another embodiment of a spring strut according to the invention with an auxiliary device including a hydraulic cushion.

The embodiment form of a spring strut 100" shown in FIG. 3 shows an auxiliary device 13 constructed as a pneumatic spring or a hydraulic cushion 25. The pneumatic spring or hydraulic cushion 25 comprises a ring piston 26 sealingly guided in a ring cylinder 27 is supported on a support ring 28 which is axially adjustable on container 7. A spring plate 29 of the spring carrier 11 lies on the bottom of the ring cylinder 27, while the pressure in the pneumatic spring or hydraulic cushion 25 is built up via a pneumatic or hydraulic connection located in the ring piston 26. The force of the pneumatic spring or hydraulic cushion 25 acting on the spring plate 29 in the direction opposite to the supporting spring 14 corresponds to the product of the effective cylinder surface of the pneumatic spring or hydraulic cushion 25 and its internal pressure. This enables the adaptation of the effective damping force in a simple manner which may be adjusted by a computer-controlled pneumatic or hydraulic system. Further, a fail-safe effect is achieved because a rise in the damping force results from a drop in pressure, or a failure, in the pneumatic spring or hydraulic cushion 25, since a greater force of the supporting spring constructed as a helical pressure spring 14 acts on the damping valve 16 in this condition.

Figure 4:
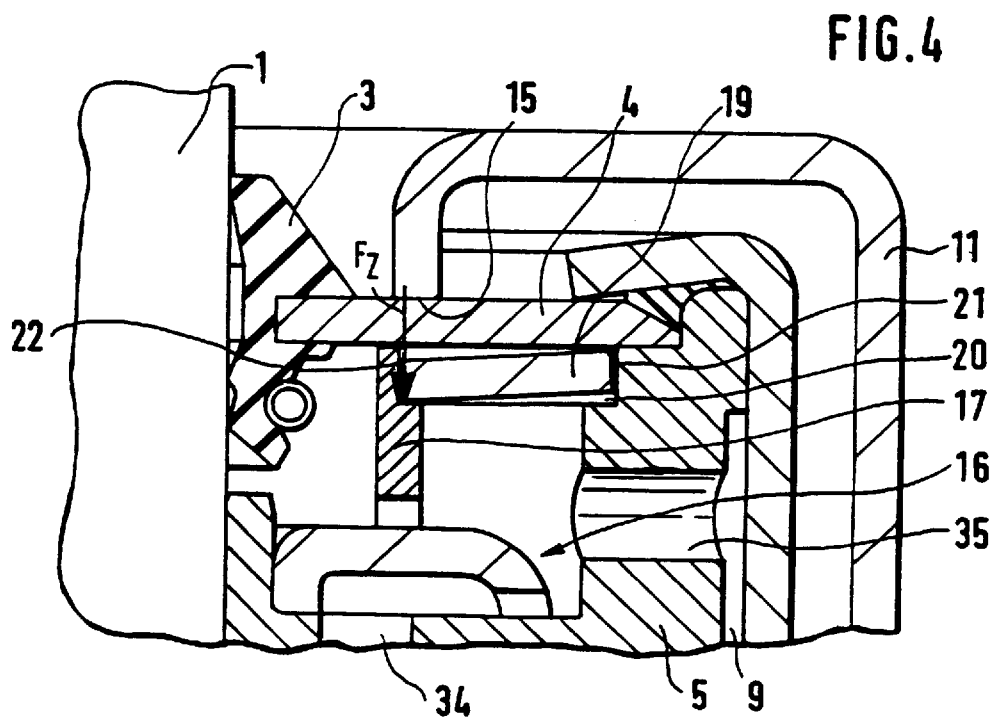
FIG. 4 is a partial sectional view of the piston rod guide of the spring strut according to the invention with a disk spring forming an additional force.

The section of the spring strut 100 according to FIG. 4 shows the arrangement of the disk spring 19 having an outer diameter 21 in the annular groove 20 of the piston rod guide 5 and an inner diameter 22 of the disk spring 19 in an annular cut out portion of the transmission ring 17. The disk spring 19 is installed so that it exerts on the transmission ring 17 a force $F_z$ acting in the direction of the damping valve 16. The force $F_z$ is in addition to the force of the spring carrier 11 acting via the contact surface 15 and the flexible disk 4. With this kind of an arrangement of the disk spring 19, any conceivable additional force can be exerted on the damping valve 16, so that very large contact pressure forces can be realized. To prevent a rise in pressure in the space below the piston rod seal 3, the transmission ring 17 is provided with at least one through-opening which is formed by notches limited by the valve body. The space below the piston rod seal 3 is accordingly connected with the compensation space 9 in the radial direction 35 via these notches and openings so as to conduct fluid. The valve body is also provided with pre-opening or advanced-opening notches which form a small, constantly open cross section from the work space on the piston rod side, via the openings in the axial direction 34 and the openings in the radial direction 35, into the compensation space 9.

Figure 5:
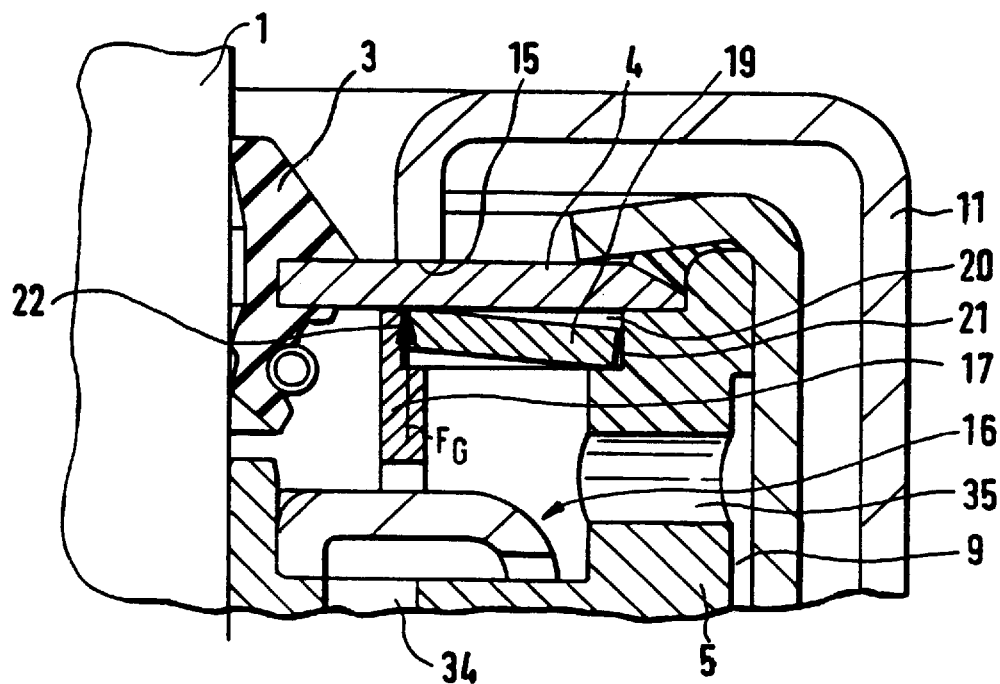
FIG. 5 is a partial sectional view of the piston rod guide of the spring strut according to the invention with a disk spring generating a counterforce.

FIG. 5 shows an installation of the disk spring 19 which is modified with respect to the construction according to FIG. 4. The outer diameter 21 of the disk spring 19 is axially supported in the annular groove 20 of the piston rod guide 5 and the inner diameter 22 presses against the flexible disk 4 so that a counterforce FG is generated opposite to the force exerted by the spring carrier 11 on the flexible disk 4. With respect to operation, this arrangement of the disk spring 19 substantially corresponds to the description above with reference to the auxiliary device 13 shown in FIGS. 1, 2, and 3. The essential difference is that no possibility is provided for adjusting the spring force of disk spring 19. The reference numbers which are not mentioned correspond to those in FIG. 4.

Figure 6:
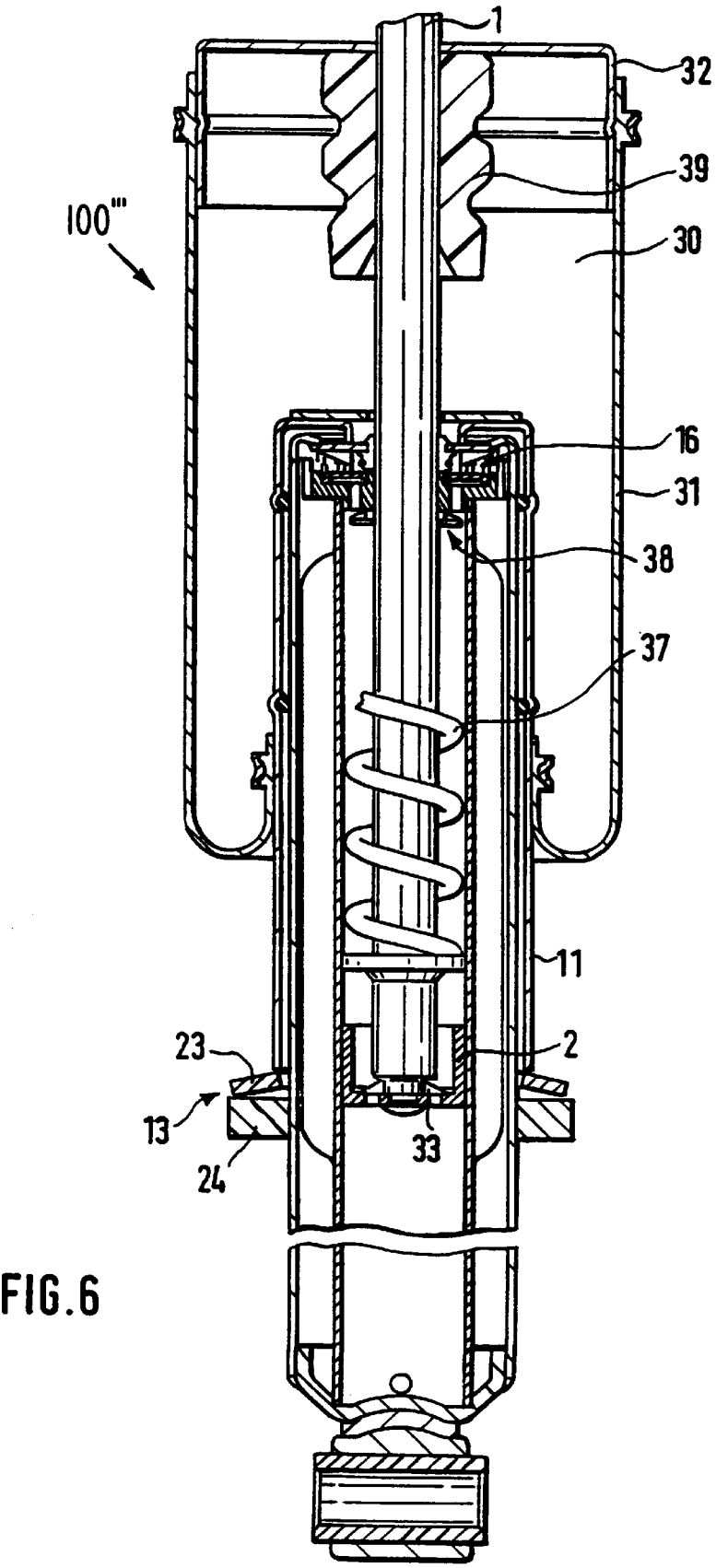
FIG. 6 is a sectional view of a spring strut according to another embodiment of the invention along a longitudinal axis with a gas spring as a supporting spring and with an auxiliary device.

A spring strut 100'" with a gas spring 30 instead of supporting spring 14 is shown in FIG. 6. A spring bellows 31 is connected with the spring carrier 11 on the one hand and, on the other hand, with a spring cup 32 arranged at the free end of the piston rod 1 so as to be tight against pressure. As in the constructions described above, the auxiliary device 13 acts on the spring carrier 11 and comprises the mechanical spring 23 constructed as a disk spring and by the adjusting ring 24. In the case of large springing-out paths of the piston rod 1 out of the cylinder 6, a tension stop spring 37 acts on a hydraulic mechanical tension stop 38 that is positioned below the piston rod guide 5. The tension stop spring 37 substantially reduces the cross section of the openings in the axial direction 34 and accordingly increases the damping force when it acts on the hydraulic mechanical tension stop 38. A rise in push damping after a predetermined movement path of the piston rod 1 into the cylinder 6 is effected by a buffer 39 which then acts on the spring carrier 11 so as to increase force. This construction shows not only vibration damping with variable load dependence, but also the simple combination with the known devices for increasing damping force which act in the pull and/or push direction.

The invention is not limited by the embodiments described above which are presented as examples only but can be modified in various ways within the scope of protection defined by the appended patent claims.

I claim:

1. A spring strut for a vehicle, comprising:

a container having a bottom end and an open upper end;

a piston rod guide connected at the open upper end of said container and having a bore hole;

a piston rod having an upper end and a lower end and guidably inserted through said bore hole of said piston rod guide;

a piston mounted on said lower end of said piston rod so that said piston is movable in said container;

said piston rod guide having a piston rod seal for outwardly sealing said piston rod;

said piston rod guide comprising a damping valve connecting a space above said piston and a compensation space in said container;

a spring carrier mounted on said container and having a contact surface acting on said damping valve of said piston rod guide with a damping force;

a support spring arranged between a structural component of the vehicle and said spring carrier; and an auxiliary device exerting a force on one of said spring carrier and said support spring, said auxiliary device being arranged such that the damping force exerted on said damping valve produces a predetermined damping effect throughout an operating range of compression of said support spring, wherein said auxiliary device is fixedly connected to one of said container and a vehicle part mounted in a fixed position relative to said container.

2. The spring strut of claim 1, wherein said auxiliary device exerts said force on said spring carrier and said auxiliary device comprises one of a mechanical spring, a pneumatic spring, and a hydraulic cushion.

3. The spring strut of claim 1, wherein said force exerted by said auxiliary device is continuously adjustable within a range.

4. The spring strut of claim 1, wherein said supporting spring comprises a helical pressure spring and said force exerted by said auxiliary device opposes a spring force of said helical pressure spring.

5. The spring strut of claim 1, further comprising an adjusting ring continuously adjustably mounted on said container and wherein said auxiliary device comprises a helical spring surrounding said container and fitted between said spring carrier and said adjusting ring.

6. The spring strut of claim 1, wherein said auxiliary device comprises a pneumatic spring or a hydraulic cushion arranged between said spring carrier and a supporting ring mounted on said container.

7. The spring strut of claim 1, wherein said piston rod guide further comprises a flexible disk and a transmission ring and said contact surface of said spring carrier acts on one of said flexible disk and said transmission ring and wherein said auxiliary device comprises one of a disk spring and a diaphragm spring supported between said piston rod guide and said transmission ring.

8. The spring strut of claim 7, wherein a spring force of said one of a disk spring and a diaphragm spring opposes the direction of said spring force of said supporting spring.

9. The spring strut of claim 7, wherein said one of a disk spring and a diaphragm spring comprises said disk spring having an outer diameter and an inner diameter; and said outer diameter of said disk spring is inserted in an annular groove of the piston rod guide and said inner diameter of said disk spring centers an annular cut out portion of the transmission ring.

10. The spring strut of claim 7, wherein said contact surface of the spring carrier rests on the flexible disk and said flexible disk comprises a carrier plate for the piston rod seal.

11. The spring strut of claim 7, wherein said one of a disk spring and a diaphragm spring comprises said disk spring and wherein said disk spring is arranged external to and above said piston rod seal; and a spring force of said disk spring acts on one of said spring carrier and said flexible disk.

12. The spring strut of claim 1, wherein said the supporting spring comprises a gas spring having a spring bellows fixedly connected between the spring carrier and a spring cup arranged at the free end of the piston rod.

13. The spring strut of claim 1, wherein a damping force of said damping valve adjusts in response to said force exerted by said auxiliary device.

* * * * *